N. W. YOUNG.
BINDING AND TYING MECHANISM.
APPLICATION FILED MAR. 4, 1911.
1,008,767.
Patented Nov. 14, 1911.
7 SHEETS—SHEET 1.
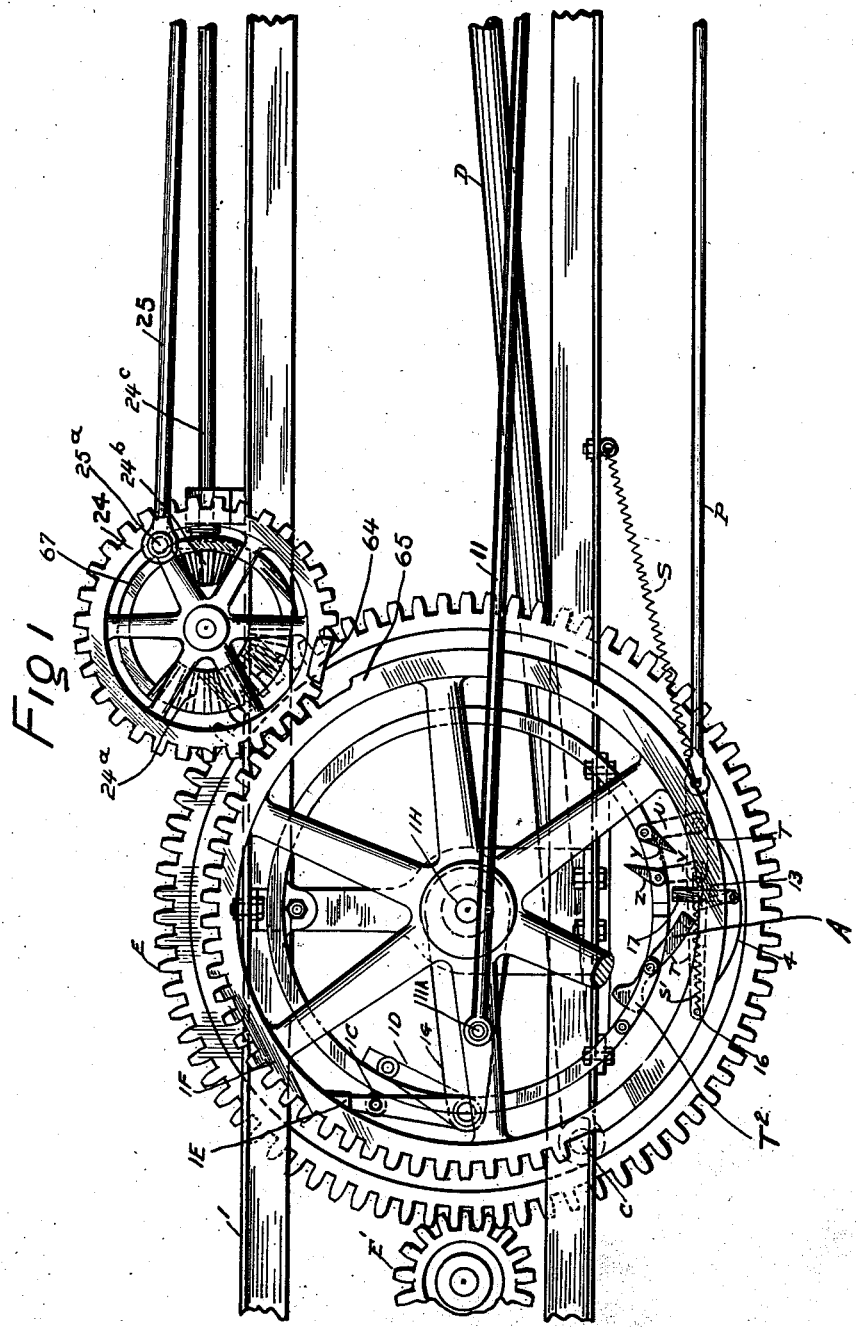

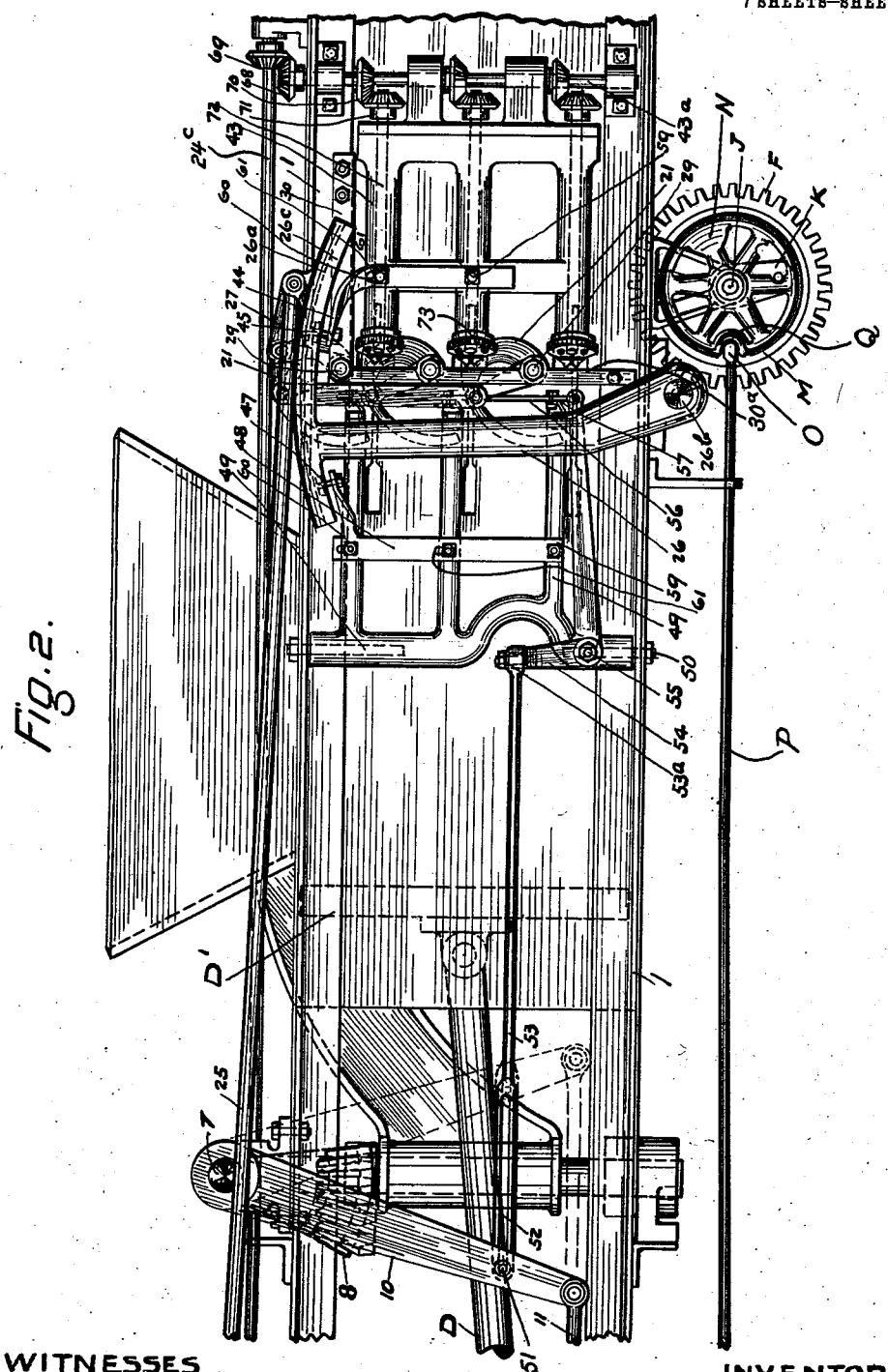

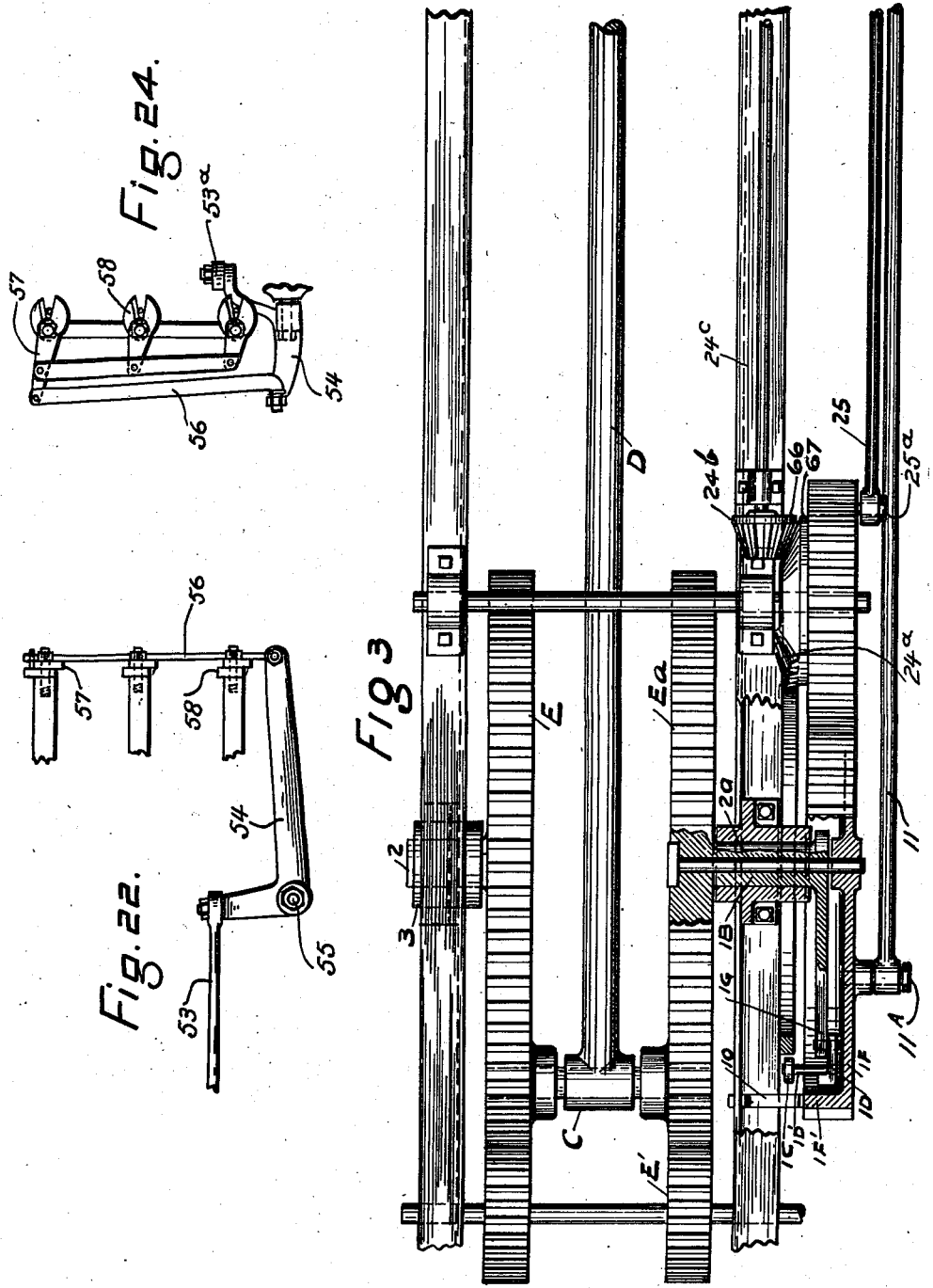

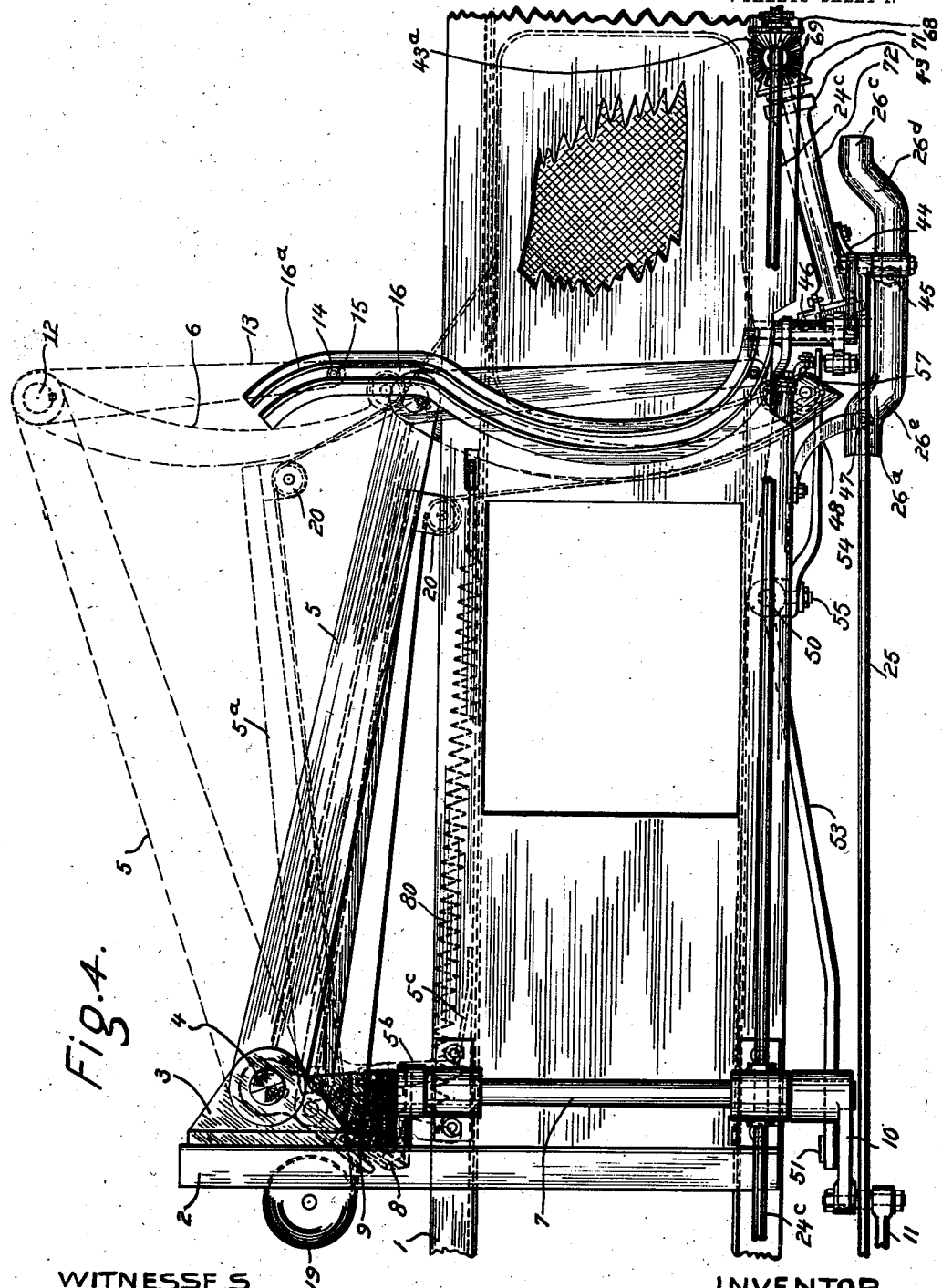

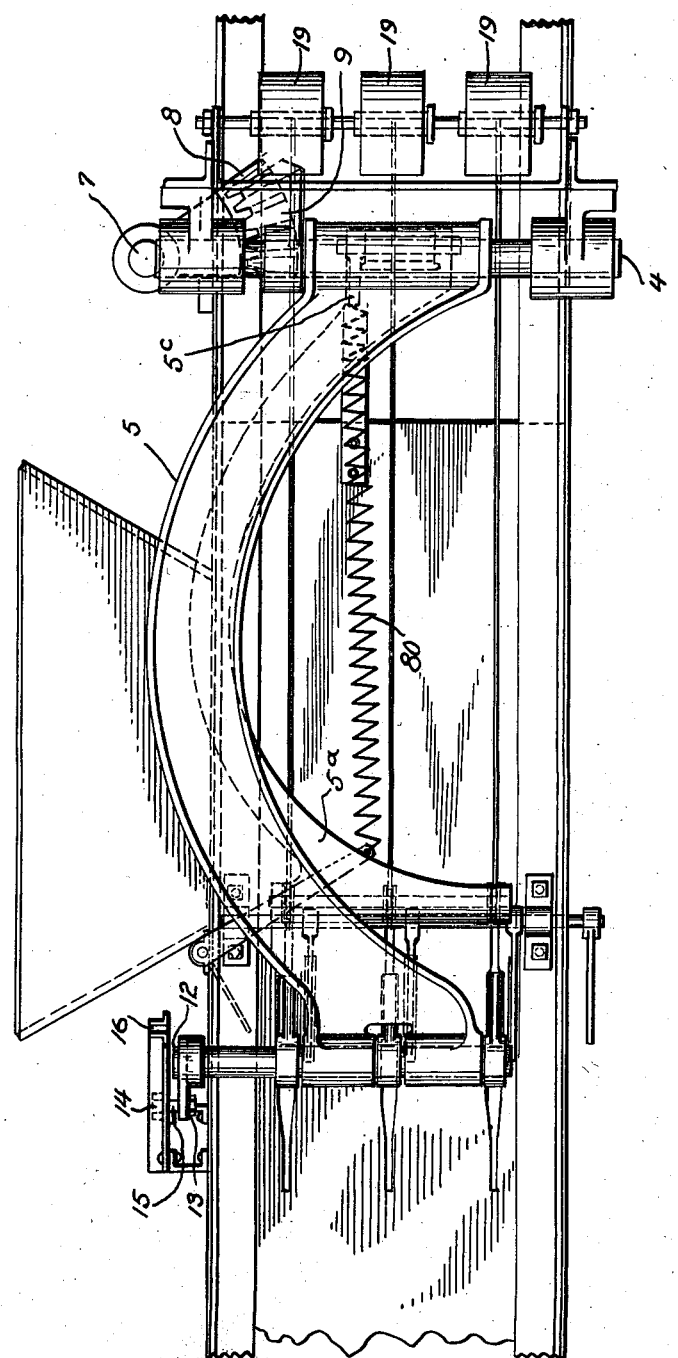

N. W. YOUNG.
BINDING AND TYING MECHANISM.
APPLICATION FILED MAR. 4, 1911.
1,008,767.
Patented Nov. 14, 1911.
7 SHEETS—SHEET 6.
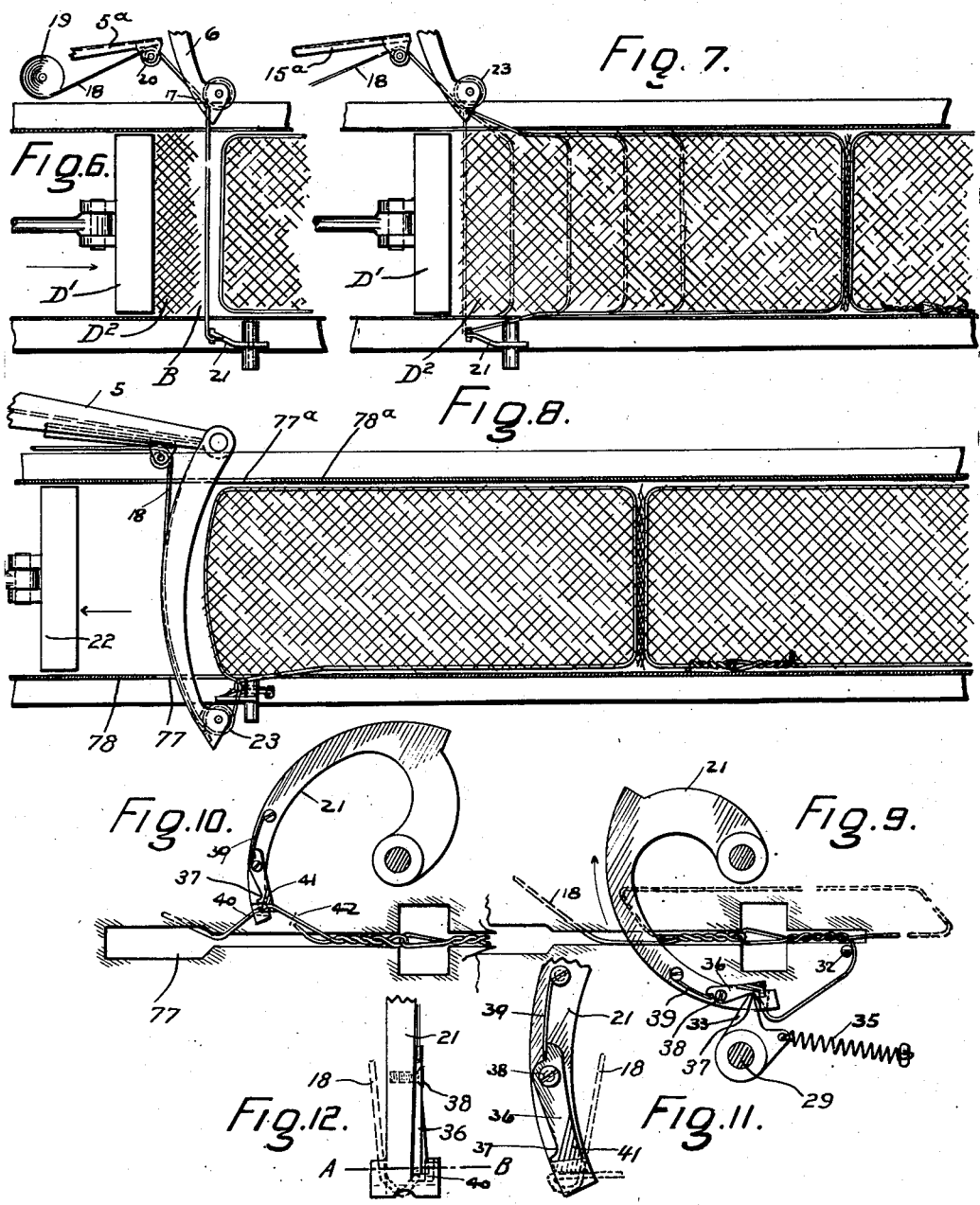
WITNESSES
INVENTOR
Morris W. Young
BY
ATTORNEY

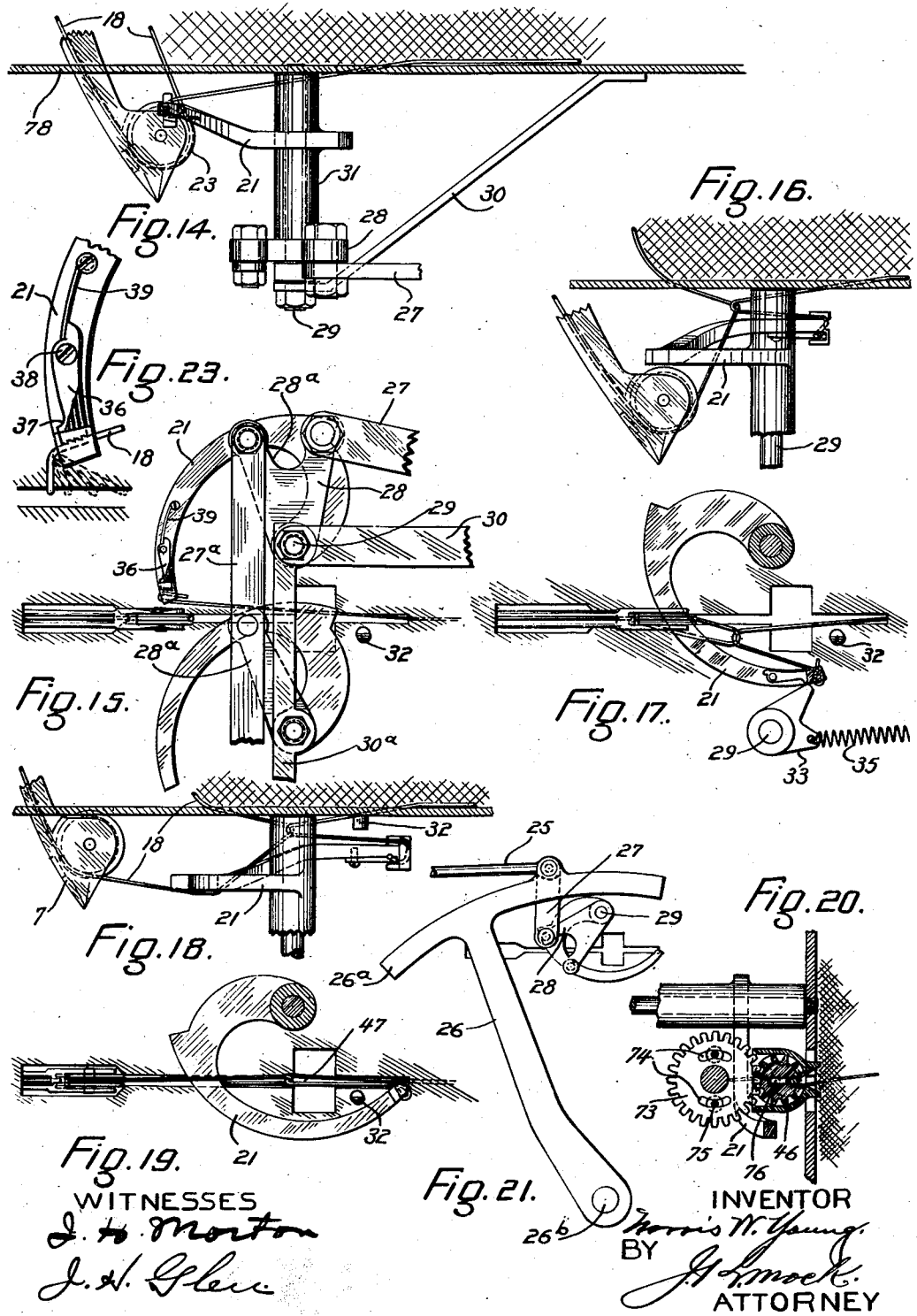

UNITED STATES PATENT OFFICE.

NORRIS W. YOUNG, OF WILSONVILLE, OREGON.

BINDING AND TYING MECHANISM.

1,008,767.

Specification of Letters Patent. Patented Nov. 14, 1911.

Application filed March 4, 1911. Serial No. 612,314.

*To all whom it may concern:*

Be it known that I, NORRIS W. YOUNG, a citizen of the United States, residing at Wilsonville, in the county of Clackamas and State of Oregon, have invented certain new and useful Improvements in Binding and Tying Mechanisms, of which the following is a specification.

This invention relates to improvements in binding and tying mechanisms and especially to that class of machines in which hay bales or any similar bundles are bound together and tied.

The object of the invention is to arrange one or more needles or wire carrying elements so as to carry the wire across the baling chamber and to arrange a corresponding number of elements for looping the ends of the wires into the loop of the portion carried by the first named elements, whereby both members of each looped portion may be twisted about each other, by any suitable twisting mechanism, preferably that covered in a former application filed by me, under Serial Number 592,287, and to arrange the said wires about bundles of material and bind them into bales. I accomplish these objects by the mechanism illustrated in the accompanying drawing, in which—

Figure 1 is an elevation of that portion of a framework carrying a driving mechanism. Fig. 2 is an elevation of that portion of a framework carrying the tying mechanism. Fig. 3 is a plan view of Fig. 1. Fig. 4 is a plan view of Figs. 2 and 5. Fig. 5 is an elevation of the opposite side from Fig. 2. Fig. 6 is a sectional plan of a part of the baling chamber, showing the binding wire as carried from the spool across the chamber, with first feed of material to be bound. Fig. 7 is a similar view, showing a number of feeds compressed. Fig. 8 shows a completed bale and another bound, with the needles in position, just as the looping operation has begun. Fig. 9 is a detail view of a secondary looping needle, releasing a wire after the tying operation is completed. Fig. 10 shows the same element as it is engaging the wire, adjacent the point where it is to be severed for releasing the bale. Fig. 11 is an enlarged side elevation of the end of a secondary looping needle. Fig. 12 is an edge view of same. Fig. 13 is a section of Fig. 12 on the line A—B. Fig. 14 is a plan of an enlarged view showing the end of the primary needle, and the secondary needle in their relative positions as the looping is about to take place. Fig. 15 is a side view of same, showing a duplication of the needles. Fig. 16 is a plan view of the needles after the looping has begun. Fig. 17 is a side elevation of Fig. 16. Fig. 18 is a plan of the needles just as the looping is completed. Fig. 19 is a side elevation of Fig. 18. Fig. 20 is a sectional end elevation of Fig. 18, and a section of a twisting mechanism, embracing the looped wires. Fig. 21 shows a cam arm and connecting link, which hold the secondary looping needle in position, during the twisting of the wires. Fig. 22 shows the operating mechanism on the cutter frame. Fig. 23 is a detail view of the wire holder showing the wire in successive positions in the process of the formation of the bale, as the compressed material is forced against it. Fig. 24 is an end view of Fig. 22.

Similar characters of reference indicate similar parts in each of the views.

The present application of this invention relates to the binding of bales in a hay press; and it may be assumed the machine is in condition for operation. Spools of wire having been arranged in place on the holders 19 and the end of the wire in each case passed through the tightener, and from these through the eye 17 of the primary needle; thence through the aperture 77ª in the plate 78ª of the baling chamber; thence across the baling chamber to the opposite plate 78 and through the aperture 77 to the point of the secondary looping needle 21 where it is held by the holder 36.

The plunger rod D, which is pivoted to the crank pin C, formed upon the spokes of the oppositely disposed wheels E and Eª, is made to reciprocate with each revolution, driving with it the plunger head D′ carrying material D², by which the teeth of wheel F, mounted on shaft J, which has its bearings at a convenient point on the frame 1, are engaged and thus rotate a distance equal to the thickness of material compressed by the plunger at one forward movement. The movement causes shaft J to revolve, carrying forward crank K, the pin of which projects between the spokes of wheel M, and after moving in the space between two spokes, the pin contacts with the adjacent spoke, carrying the wheel M with it. This space results as follows: At the conclusion of the preceding binding operation, the shoe O, on the rod P, was left at the lower edge of the notch Q with wheel M slightly in advance of wheel F, due to the action of the eccentric weight N.

When the drive wheels shall have made a sufficient number of revolutions to cause the wheel F to make one complete turn, the rod P drops into the notch Q on the periphery of the wheel M, due to the action of spring S which opened the switch mechanism illustrated in Fig. 1 and which is made the subject of my application No. 599,899.

It will be observed that the force applied by the plunger must be sufficient to move the compressed material in the tension chamber, which in this case is similar to that in all continuous presses, before the wheel F will move. This will occur as the plunger reaches the limit of its forward movement, which will bring the crank pin C to the right center, and the roller $1^c$ which is always approximately 60 degrees in advance of the crank pin, will therefore at this moment be very near the outlet switch $y$—$z$. Should the number of feeds now be sufficient to complete one turn of wheel F, the rod P will drop into the notch Q as above described, thereby opening the switch $y$—$z$. The charges of material thus compressed will be held against return movement in any usual manner.

Upon the opening of the outlet switch $y$—$z$, Fig. 1, the roller $1^c$ passes through it carrying link $1^D$ to its driving position where it engages the lug $1^E$, at the point where it left it upon entering the inlet switch A, at the close of the former operation, and carries with it, wheel $1^F$, upon a spoke of which is crank pin $11^A$, driving the rod 11.

The operation of tying a bale takes place during one revolution of wheel $1^F$, and this is timed to begin at the instant the plunger has receded a distance sufficient to permit the primary needle to pass between it and the material to be bound. Since the wheel $1^F$ moves simultaneously with the drive wheels E and $E^a$, during this operation the plunger will accordingly make one complete movement from that point.

It will be seen by reference to Fig. 7 that with each stroke of the plunger the material is forced against the body of the wire standing across the chamber, and a portion thereof is paid off from the spool 19, so that when the tying is ready to begin, the wire is already about two sides and an end of the compressed material.

It was seen that when the wheel $1^F$ was set in operation, motion was transmitted to the rod 11, which in turn rocks the arm 10, connected with shaft 7, upon which is the partial bevel gear 8, meshing with a similar partial gear 9, rigidly secured to shaft 4, upon which is supported the arm 5 which carries at its end the vertical shaft 12, upon which are rigidly secured the primary looping needle or needles 6. Attached to one end of shaft 12 is secured a guiding arm 13, having at its end a roller 14, revolving on the pin 15, the roller being adapted to travel in the curved guide-way 16, across the baling chamber. With the beginning of the movement of the rod 11, the arm 5 which is arched to permit the trucks to turn thereunder, also begins to move toward the machine from its position shown in dotted lines in Fig. 4, carrying with it needles 6 and arm 13.

Since the needles and arm 13 are all rigidly secured to shaft 12, the movement of the roller 15 in its guide-way 16 causes the points of the needles to describe a corresponding movement as they cross the chamber, thereby gathering the lose particles of material.

As motion is applied to the arm 5, the primary looping needle is conveyed across the chamber, carrying with it from the position shown in Fig. 7, the wire 18, which moves over the pulley 23, and doubles upon itself as it goes to the opposite side of the frame, thus forming the loop over the pulley, as shown in Fig. 14. The needles enter through opening $77^a$ in the plate $78^a$, cross the chamber and emerge through the opening 77 of the casing 78 thereof.

In swinging toward the machine the arm 5 contacts with the pivoted arm $5^a$ which carries at its extremity the tightener wheel 20. At the pivoted end of arm $5^a$ is a bell crank arm $5^b$, to the end of which is secured the spring 80 against which the arm $5^b$ pulls when the arm $5^a$ is forced toward the machine. At the beginning of the return of the primary needle the wire would become slackened and the corresponding return movement of arm $5^a$, in response to spring 80 immediately takes up this slack and holds the wire taut for the twisting operation. This outward motion of arm $5^a$ continues until the portion $5^b$ strikes the stop $5^c$. At this point the teeth of gear wheel $1^F$ engage the teeth of wheel 24 and at the same time disengage the lock 64 from the race 65, which permits wheel 24 to revolve, until the lock comes again in contact with the race 65, where it remains stationary until the above described process is repeated, during the next tying operation, and also insures the proper meshing of the teeth of said wheels.

At the beginning of the above described movement the crank $11^A$ was nearing its back center, leaving rod 11 and consequently the primary needle, practically stationary for an instant, to allow the secondary looping needles to pass between the members of said loop formed by the primary needle, carrying with it the end of the wire, and thereby forming therein a second loop, as shown in Figs. 16 to 19. This movement was accomplished as follows: The wheel 24 transmitted its motion through the rod 25, mounted on the pin 25ª, to the cam arm 26, which is pivotally connected to link 27, which is pivoted to arm 28, which is free to revolve on shaft 29. This shaft is secured, at a proper point, to the side of frame 1 and supported by bracket 30 and bar 30ª. The arm 28 is formed integrally with a sleeve 31 extending over the shaft 29; and at an intermediate point, is formed integrally the secondary looping needle 21. In the position shown in Fig. 19 the needle 21 has completed its forward movement, and has brought the wire, looped together in the manner described, with the end of one loop in position to be engaged by the wire twister; and on its way it raised the wire over the beveled pin 32, where it will remain hooked as the needle recedes. In this case I have employed the form of twister disclosed in my application No. 592,287. With the forward movement of rod 25 which set in operation the secondary looping needles, as above described, it carries with it arm 26 which is pivotally mounted, at the bottom of the framework, on shaft 26ᵇ. At the upper end of said arm is formed a cam 26ª, having the groove 26ᶜ in its lower face, as shown most distinctly in Fig. 4. Upon the twister frame 43, which is pivotally secured upon vertical shaft 43ª, is secured a bracket 44 carrying at its outer end the roller 45, which is adapted to travel in the groove 26ᶜ. As the rod 25 is carried to the left in its reciprocatory movement, as shown in Fig. 4, the curve 26ᵈ deflects the roller 45, forcing it toward the body of the machine, swinging the twister frame 43 with it, and throwing inward the twisters 46 shown in Fig. 20, so as to grasp the wire at the point 47 in the position indicated in Fig. 19. At the moment the twister thus engages the wire, the partial bevel gear 24ª engages the pinion 24ᵇ and at the same time disengages the lock 66 from the race 67, which permits pinion 24ᵇ to revolve, until the lock comes again in contact with the race 67, where it remains stationary until the above described process is repeated during the next tying operation, the lock insuring the meshing of the teeth. The said shaft 24ᶜ leads from pinion 24ᵇ to the bevel gearing 68, meshing with the gear 69, mounted on the vertical shaft 43ª. Upon this shaft is mounted a number of bevel gears 70, corresponding with the number of needles used, which engage corresponding pinions 71 on shafts 72. At the end of each shaft 72 is formed a flange upon which is secured gear 73. In these gear wheels are formed at opposite sides, slots 74, to receive the bolt 75, which secures thereto the wheel 73, see Fig. 20. The purpose of these slots is to permit a slight back and forth adjustment of the twisters 46, so that the slot 76 therein will always stop opposite the opening of its holder which is secured upon the frame 43, thereby insuring the engagement of the twister with the wire. At the moment the gear 24ᵇ was unlocked, setting in motion shaft 24ᶜ, that motion was transmitted to the twister wheels 46, twisting the loops as shown in Figs. 9 and 10. During the twisting of the wire it becomes necessary for the secondary needles to remain practically stationary for an instant, which result is accomplished by rod 25 passing over the back center of wheel 24 at the same instant that cam arm 26 passes over its center, with relation to link 27, see Fig. 21. By the time these parts begin their active movement again, in the opposite direction, the twisting operation is completed and the receding movement of the secondary needles begins. While this twisting of the loops is taking place, the crank pin 11ª is passing over that portion of its revolution intermediate of its front and back centers, which imparts the most rapid movement to the transmission rod 11, operating the primary needles causing them to recede quickly from the chamber, drawing their respective wires over the corresponding secondary needles, as shown in Fig. 9. The eccentricity of the secondary needle, being such that as it passes downward, it moves out of the line of movement of the primary needle. In said Fig. 9 is shown the position of a secondary needle as it recedes, the loops of wire having been twisted and one member looped over the pin 32, which holds the wire during the return movement of the needle. During this forward movement of the needle 21 it contacts with the trigger 33 pivoted on shaft 29 moving it forward to the position shown in Fig. 17, carrying with it the spring 35, beyond its normal line of pull, so that there is a constant upward pressure of the trigger, against the said needle. Upon the return movement of needle 21, the point of the trigger bears against the lower surface thereof until it reaches the wire holder 36, which is provided in its lower edge with a notch 37, in which it engages. This holder is pivoted at 38 and as the movement continues, the trigger is rotated backward on its bearing pin, throwing the holder upward on its pivot, against the action of spring 39, bearing on the opposite end thereof, and releasing the wire, which was held in the notch 40, at the outward end of the needle. The trigger having swung back until it is released by the needle, it returns to its normal position, in response to the pull of spring 35. During the further movement of needle 21 it moves upward against the inner side of that portion of the wire which extends across the chamber, through the eye of the primary looping needle, to its spool. As it swings upward the wire passes, relatively, toward its end, pressing against the ribs 41 of the holder, which lie diagonally on its face, these needles being irregularly curved, with the point farthest from the center, the motion of the wire is crosswise of the needle, causing the holder 36 to swing open, permitting the wire to drop into the notch 40, when the spring 39 causes it to return to clamp the wire therein, where it is held until released, as above described, in the succeeding operation. In this receding movement of the needle the wire is pulled upward as indicated in Fig. 10, and the portion at the loop being stationary the wire is paid off from the spool, which also causes a transverse movement of the wire through the notch 40.

The holder 36 is made of a length to barely clear the bottom of notch 40, the outer corner being longer and the outer edge of the holder being thicker than the inner, and is provided at its extremity with teeth, which bear against the wire. Any forward pull of the wire will, therefore, cause the holder to bite onto it, either at the end of the holder or at the side, with a pressure increasing with the tension of the wire, as shown in Figs. 11, 12, 13, and 23. As the secondary needles begin to recede in response to the return movement of rod 25, the roller 45 passes through the curved portion 26$^d$ of the groove 26$^c$, which immediately swings the twister frame 43 outward, where it will remain till the succeeding operation. This return movement of rod 25, carries the cam 26$^a$ to the right and the curve 26$^e$ of the groove 26$^c$ in which moves roller 47', mounted at the end of a bracket 48, which is secured upon the cutter frame 49, pivotally mounted on the frame 1 upon the vertical shaft 50, causes the cutter frame to swing toward the body of the machine, bringing the cutter in contact with the wire at the point 42, where it is to be severed. In this case I have used the form of cutter disclosed in my application No. 586,809. At the moment the wheel 24 comes to rest after causing the secondary needles to return to their normal position and swinging the cutter frame to cutting position, the rod 11 is approaching the limit of its motion to the right, the pin 51 on the arm 10 moving in the slot 52 of the rod 53 contacts against the extremity thereof forcing the said rod to the right. This rod being connected by a suitable universal joint 53$^a$, with the bell crank 54 rocks it upon its shaft 55 and this motion is in turn transmitted to link 56, which is pivotally connected to the movable lever 57, reciprocating upon the fixed member 58 of the wire cutter, thereby severing the wire.

It will be observed that in both the cutter frame and the twister frame by removing bolts 59 and loosening bolts 60 secured in the slots 61, the brackets 44 and 48 will drop downward, so as to remove their respective rollers, 45 and 47 from the groove 26$^c$, and may be swung back from the frame 1 when necessary for inspection or repairs.

The necessity for the universal joint 53$^a$ arises from the fact that the cutter frame is adapted to swing on its pivot 50, which causes a similar motion in the member of the bell crank on which said joint is formed and when the rod 53 reciprocates to rock the bell crank 54, it causes a motion in a plane at right angles to that of the former motion. At the completion of the foregoing operation the center of the universal joint comes to rest in line with the center of shaft 50, that being the limit of the stroke of the arm 10, where it remains till the pin 51 of arm 10 contacts with the opposite end of slot 52 at the beginning of the next tying operation. This position of the upright member of the bell crank permits the cutter frame to swing outward, without transmitting any motion to rod 53.

It is necessary to provide for the removal of the primary needle from the baling chamber before the return of the plunger, with its succeeding charge of material. This is accomplished by an over stroke of crank pin 11$^a$. At the beginning of the simultaneous movements of the plunger and primary needles, the said crank pin started its rotation from a point about 60 degrees below its right center of stroke, and when it reached a corresponding point above that center, the point of the needle emerged from the chamber, considerably in advance of the plunger in its forward movement. During the remainder of the revolution of the crank pin, the primary needle swings away from and back to the machine, giving the plunger time to compress its charge and return to the point in which it was when the tying operation commenced. Here the wheel 1$^F$ will have completed its revolution leaving the primary needle at rest till the succeeding tying operation.

In the over stroke of the primary needle, the roller 14 travels through the portion 16$^a$ of the guide-way 16 which carries the eye of the needle along the line of the portion of wire between the machine and the tightener. In this manner it avoids paying off slack wire from the spool, during this movement. As the roller 1$^c$ passed through the outlet switch, it struck the point T$^2$ on the segment A, swinging it on its pivot so that the lower end came into the path just passed by the roller. It will be seen therefore, that at the completion of one revolution of wheel 1$^F$ the roller strikes the switch, point $y$ closing it and passing on, strikes the lower end of segment A, throwing the roller within the switch, and as it moves over the upper end of the segment swings it into line again, and the wheel 1ᶠ will remain stationary till the switch is again opened in the manner above described.

The movement of switch point Y, through arm U and link T, retracts the rod P withdrawing the shoe O thereon from the notch Q in the periphery of wheel M and the eccentric weight N swings the wheel M, so that the shoe will bear on the periphery for one turn. This retracting movement of rod P also swings the lock 13 beneath the end of segment A, thereby holding it in position till released by the action of spring S, in a manner previously described.

The secondary looping needles are arranged one above the other and the number employed depends upon the work to be performed. They are mounted on shafts 29, the driving needle being connected to a motive power, through link 27, and the other needles are connected thereto, in series, through arms 28ᵃ and the link 27ᵃ, whereby a simultaneous movement of all the needles is secured.

It will be observed that at the beginning of the forward movement of rod 25, through action of roller 47 in the curve 26ᵉ of the groove 26ᶜ, the cutter frame will be swung from its cutting position, and out of the path of the secondary needles, where it will remain until the return movement of rod 25.

Having thus described my invention, what I claim is:

1. The combination with a baling-press of a looping needle for carrying a looped wire across the rear of each bale,—a secondary needle for looping the end of the wire in the first named loop,—shafts upon which said needles are mounted,—means connecting said shafts whereby the needles will operate at successive intervals,—and means actuated by the baling-press for operating said shafts.

2. The combination with a baling-press of a looping needle for carrying a looped wire across the rear of each bale,—a guideway for causing the point of the needle to swing outward as it crosses the bale,—means connecting the needle with said guideway,—a secondary needle for looping the end of the wire in the first named loop,— shafts upon which said needles are mounted,—means connecting said shafts so they will operate at successive intervals,—and means actuated by the baling-press for operating the shafts.

3. The combination with a baling-press of a primary looping needle for carrying a looped wire across the rear of each bale,—a secondary needle for carrying the end of the wire through the first named loop to form a second loop, the secondary needle being of irregular shape so that after the point thereof passes through the first mentioned loop, the needle will withdraw from the line of movement of the primary needle,—shafts upon which said needles are mounted,—and means connecting said shafts whereby the needles will be operated at successive intervals.

4. In combination with a baling-press having a plunger mounted to reciprocate longitudinally therein, a primary looping needle for carrying a looped wire transversely through said press,—a secondary needle for carrying the end of the wire through said loop to form a second loop,— shafts upon which said needles are mounted,—means for operatively connecting said plunger and primary needle so that the latter will withdraw from the press and complete one vibration outside thereof while the former makes one forward and return movement in the compression chamber,—means connecting said shafts so they will operate at successive intervals,—and means actuated by the baling-press for operating said plunger and shafts.

5. In combination with a baling-press having a plunger mounted to reciprocate longitudinally therein, a primary looping needle for carrying a looped wire transversely through said press,—a secondary needle for carrying the end of the wire through the said loop to form a second loop,—shafts upon which said needles are mounted,—means for operatively connecting said plunger and primary needle so that the latter will traverse the baling-chamber and return during one rearward and return movement of the former,—means connecting said shafts so they will operate at successive intervals,—and means actuated by the baling press for operating said plunger and shafts.

6. In a device of the character described, in combination, a frame-work,—an arm pivotally mounted at the side thereof,—a primary looping needle mounted at the extremity of the arm and adapted to carry a wire through the body of the frame-work,— a secondary looping needle mounted at the opposite side of said frame-work and adapted to carry the end of the wire over that portion carried by the primary needle,— and means mounted on the frame-work for operating said needles.

7. In a baling-press, in combination, a frame-work,—a primary looping needle mounted at one side thereof and adapted to carry a looped wire therethrough,—a secondary looping needle mounted at the opposite side of the frame-work and vibrating in a plane at right angles to that of the primary needle and carrying the end of the wire through said loop, whereby the wire is looped about the bale,—and means mounted on the frame-work for operating said needles.

8. In a baling-press, the combination of a frame-work having a primary looping needle pivotally mounted at the side thereof and adapted to reciprocate through said frame for carrying a looped wire across the rear of the bale,—a secondary needle pivotally mounted at the opposite side of said frame and adapted to carry the end of the wire through said loop to form a second loop,—shafts upon which said needles are mounted,—a twister, in a frame pivotally mounted on said frame-work, whereby the twister will swing into engagement with said loops,—means connecting said shafts and twister-frame whereby they will operate at successive intervals,—and means actuated by the baling-press for operating said shafts and twister.

9. In a baling-press, the combination of a frame-work having a primary looping needle pivotally mounted at the side thereof and adapted to reciprocate through said frame for carrying a looped wire across the rear of the bale,—a secondary needle pivotally mounted at the opposite side of said frame and adapted to carry the end of the wire through said loop to form a second loop,—shafts upon which said needles are mounted,—a twister in a frame, pivotally mounted on said frame-work, whereby the twister will swing into engagement with said loops,—a cutter, in a frame pivotally mounted on said frame-work, whereby the cutter will swing into engagement with the wire,—means connecting said shafts, twister-frame and cutter-frame, whereby they will operate at successive intervals,—and means actuated by the baling-press for operating said shafts, twister and cutter.

10. In a baling-press, the combination of a frame-work having a primary looping needle pivotally mounted at the side thereof and adapted to reciprocate through said frame, for carrying a looped wire across the rear of the bale,—a secondary needle pivotally mounted at the opposite side of said frame and adapted to carry the end of the wire through said loop to form a second loop,—shafts upon which said needles are mounted,—a twister, in a frame pivotally mounted on said frame-work,—a cutter, in a frame pivotally mounted on the frame-work,—a double cam arm connected to said twister and cutter frames and mounted to reciprocate longitudinally to cause an alternate lateral vibration of the twister and cutter-frames,—means connecting said shafts and cam arm whereby they will operate at successive intervals,—and means actuated by the baling-press for operating said shafts and cam arm.

11. The combination with a baling-press of a looping needle for carrying a looped wire across the rear of the bale,—a secondary needle for looping the end of the wire into the first named loop,—shafts upon which said needles are mounted,—means connecting said shafts whereby the needles will operate at successive intervals,—means connected with said needles for automatically holding the wire taut,—and means actuated by the baling-press for operating said shafts.

12. The combination with a baling-press, of a looping needle for carrying a looped wire behind the bale,—a tightener pivotally mounted to stand normally at the side of the baling-chamber,—a guide-way extending across the baling-chamber to the tightener,—a guide-arm rigidly secured to said needle, upon the end of which is mounted a roller adapted to travel in said guide-way for controlling the course of the point of the needle,—a secondary needle for looping the end of the wire into the first named loop,—shafts upon which said needles are mounted,—means connecting said shafts for operating the needles at successive intervals,—and means actuated by the baling-press for operating the shafts.

13. The combination with a baling-press, of a plurality of primary looping needles for carrying looped wires behind the bale,—secondary needles each carrying the end of a wire through the loop formed by its corresponding primary needle, said secondary needles being linked in series to operate in unison,—shafts upon which said needles are mounted,—means connecting said shafts whereby the needles will operate at successive intervals,—and means actuated by the baling-press for operating the shafts.

14. In a baling-press having means for conveying material to the compression-chamber, the combination therewith of a needle-frame pivoted at one end upon the side of said chamber and having pivotally mounted at its free end needles having eyes at their extremities for the reception of wires and adapted when said frame is swung inwardly to carry the wires across the mouth of the chamber,—a guide-way for directing the points of said needles,—a crank-arm rigidly connected to the needle-frame and having formed at its extremity gear-teeth,—an intermittently-operated gearing meshing with the gear-teeth,—and means set into operation by the material being compressed for actuating said gearing.

15. In a baling-press having means for conveying material to the compression-chamber and means for conveying loops of wire across the mouth thereof to the opposite side, the combination therewith of irregularly curved needles linked in series and vibrating in unison, each being adapted to vibrate through its corresponding loop of wire, and each being provided at its extremity with a wire holder adapted to bear against and engage the wire,—mechanism for tying and severing the wire,—means operatively connecting the needles, tying and severing mechanisms,—and means actuated by the press for successively operating said parts.

16. In a baling-press, a needle pivotally mounted at the side thereof, said needle having the shape of an irregular curve and provided at its extremity with an annular flange or notch adapted to receive a wire,—a holder the front edge of which is narrowed and shortened, pivoted to vibrate in said notch, the rear edge being made to barely clear the bottom and sides thereof, so as to bind upon the wire,—means for maintaining the holder normally in line with the needle,—and means actuated by the press for operating said needle.

17. The combination with a baling-press of a looping needle for conveying a looped wire across the mouth of the compression-chamber,—a secondary needle having a notched holder at its extremity for automatically engaging and holding the end of the wire, the needle being adapted to carry the end of the wire through said loop to form a second loop,—a tripping mechanism pivoted in line with the secondary needle and adapted to engage the notch of said holder, whereby it is opened to release the wire on its return movement,—means for operatively connecting the needles,—shafts upon which said needles are mounted,—and means actuated by the press for operating said shafts.

18. The combination with a baling-press of a looping needle for conveying a looped wire across the mouth of the compression-chamber,—a secondary needle having a notched holder at its extremity for automatically engaging and holding the end of the wire, the needle being adapted to carry the end of the wire through said loop to form a second loop,—means for automatically engaging the wire at a point adjacent said loop to hold it from return movement,—a tripping mechanism pivoted in line with the secondary needle and adapted to engage the notch of said holder, whereby it is opened to release the wire on its return movement,—means for operatively connecting the needles,—shafts upon which said needles are mounted,—and means actuated by the press for operating said shafts.

19. The combination in a baling-press having means for automatically conveying material to the compression chamber and means for automatically securing the binding wires thereon, of a frame-work pivotally mounted thereon and carrying a cutter adapted to engage said wire, the cutter comprising a pair of jaws, one of which is movable to and from the other,—a bell crank connected to said movable jaw,—a shaft connecting the bell crank with an intermittent driving device,—a cam arm for swinging the frame-work to and from the wire,—and means actuated by the press for successively operating said cam arm and shaft.

20. The combination in a baling-press having means for automatically conveying material to the compression-chamber and means for automatically securing the binding wires thereon, of a frame-work pivotally mounted thereon and carrying a twister adapted to engage said wire, the twister comprising a slotted gear wheel mounted upon a shaft in a correspondingly slotted casing,—means operatively connecting said shaft with an intermittent driving device,—a cam arm for swinging the frame-work to and from the wire,—and means actuated by the press for successively operating said cam arm and shaft.

In testimony whereof I affix my signature in presence of two witnesses.

NORRIS W. YOUNG.

Witnesses:
EDWIN E. HECKBERT,
JOHN H. MORTON.